US006534032B2

(12) United States Patent
Meisen

(10) Patent No.: US 6,534,032 B2
(45) Date of Patent: Mar. 18, 2003

(54) PROCESS FOR THE PRODUCTION OF YELLOW IRON OXIDE

(75) Inventor: Ulrich Meisen, Kall (DE)

(73) Assignee: Bayer Aktiengesellschaft, Leverkusen (DE)

( * ) Notice: Subject to any disclaimer, the term of this patent is extended or adjusted under 35 U.S.C. 154(b) by 49 days.

(21) Appl. No.: 09/798,847

(22) Filed: Mar. 2, 2001

(65) Prior Publication Data

US 2001/0031240 A1 Oct. 18, 2001

(30) Foreign Application Priority Data

Mar. 6, 2000 (DE) .......................... 100 10 940

(51) Int. Cl.⁷ ............................... C01G 49/02
(52) U.S. Cl. ....................................... 423/632
(58) Field of Search ................ 423/632, 633; 106/456

(56) References Cited

U.S. PATENT DOCUMENTS

| 1,327,061 A | 1/1920 | Penniman, Jr. et al. | |
| 1,368,748 A | 2/1921 | Penniman, Jr. et al. | |
| 2,558,304 A | 6/1951 | Marcot et al. | 106/304 |
| 2,696,426 A | * 12/1954 | Marcot | 423/633 |
| 4,251,504 A | * 2/1981 | Hamabata et al. | 423/633 |
| 4,255,409 A | * 3/1981 | Hamabata et al. | 423/632 |
| 5,368,640 A | * 11/1994 | Pitzer et al. | 423/633 |
| 5,885,545 A | * 3/1999 | Pitzer | 423/633 |

FOREIGN PATENT DOCUMENTS

GB     1445288     8/1976

* cited by examiner

*Primary Examiner*—Steven Bos
(74) *Attorney, Agent, or Firm*—Godfried R. Akorli; Thomas W. Roy

(57) ABSTRACT

The present invention relates to a process for the production of an iron oxide yellow by a) adding $FeSO_4$ or $FeCl_2$ with an Fe(III) content of 0.0 to 4.0 mol % Fe(III) and a Mn content of up to 0.7 wt. %, based on the Fe content, to a solution or suspension of an alkaline component that has been heated to a temperature of between 42 and 75° C., and b) oxidizing the suspension formed with an oxidizing agent until all iron(II) has been converted into iron(III) as $\alpha$-FeOOH, whereby
the oxidizing agent is added at a rate such that the oxidation time is between 120 and 600 minutes and the reaction temperature during the entire oxidation time is at least at the temperature at which precipitation occurred.

14 Claims, No Drawings

PROCESS FOR THE PRODUCTION OF YELLOW IRON OXIDE

BACKGROUND OF THE INVENTION

Field of the Invention

The present invention relates to a process for the production of iron oxide, starting from $FeSO_4$ or $FeCl_2$ and an alkaline component.

The production of iron oxide yellow (hereinafter also referred to as α-FeOOH or goethite) has long been known. A detailed description of the prior art can be found for example in Ullmann's Encyclopedia of Industrial Chemistry $5^{th}$ edition, 1992, Vol. A20, p. 297 et seq.

The method according to Penniman-Zoph (U.S. Pat. Nos. 1,327,061; 1,368,748), the precipitation method and the Laux method are used to produce iron oxide yellow. The raw materials used are metal cuttings and iron(II) sulfate in the Penniman-Zoph method, iron(II) sulfate or iron(II) chloride and an alkaline component (sodium hydroxide solution, ammonia, $Ca(OH)_2$, etc.) in the precipitation method and ferrous metal and nitrobenzene in the Laux method.

For the first two methods a so-called seed, namely a relatively finely divided goethite, first has to be produced. This process step is usually performed in separate reactors. The seed production itself is performed at temperatures of 30 to 50° C.

In the conventional method of seed production it is not possible to precipitate all of the iron(II) and convert it to α-FeOOH by oxidation since undesirable(black) magnetite is produced at a pH greater than 6.5. Magnetite formation is dependent on temperature, oxidation rate and pH. Magnetite is preferably formed at elevated temperatures, at a relatively low oxidation rate and at a pH greater than 6.5. At a pH of 8, corresponding to complete iron(II) precipitation, magnetite is always formed. In fact at temperatures above 50° C. this is the only phase formed.

However, with the alkaline precipitation method (using a very high NaOH excess) it is possible to obtain a pure α-FeOOH phase even at elevated temperatures. Depending on the NaOH excess, more or less pronounced long needles are obtained. This method generally does not produce any products that can be used as colored pigments, primarily because all of the manganese contained in the iron raw material is precipitated out at the same time. Manganese, especially in sizeable quantities, leads to an undesirable brown tint. This alkaline precipitation method is therefore described for the production of α-FeOOH as a starting material for magnetic acicular iron oxides. The alkaline precipitation method leads to a very finely divided product. The BET surface area of an α-FeOOH of this type is between 40 and 120 $m^2/g$, which already results in a brown tint because of its very fine-particle character. The presence of color-imparting metals such as Ni, Cr, Cu, Mn is of no relevance in the starting materials for acicular magnetic iron oxides; in fact these elements are commonly used as an additive to regulate the magnetic properties.

The various iron(II) raw materials that can be used for seed production also differ in their magnetite-forming tendency.

Iron(II) chloride, a raw material that would be preferable to use since it is very inexpensive to obtain, forms comparatively large amounts of magnetite. In this case magnetite formation at a pH of 6.5 begins at only 39° C. In uncooled reactors magnetite formation can therefore not be prevented with this raw material.

Although iron(II) sulfate does not form magnetite under these conditions, it is significantly more expensive and is usually sold as a solid ($FeSO_4.7H_2O$), which means that expensive equipment is required to dissolve the salt.

The two process steps of seed production and pigment manufacture that are required in the Penniman-Zoph method and the precipitation method increase the manufacturing costs of iron oxide yellow pigments produced by these methods. The required plants are also very large, since the production rates for both methods are only around 1–2 g pigment per liter per hour during the pigment forming stage.

The production of iron oxide yellow by the Laux method requires particularly pure ferrous metal, as otherwise the color quality of the iron oxide yellow falls markedly. Since these raw materials are very expensive, this method for iron oxide yellow production is no more cost-effective than the Penniman-Zoph method or the precipitation method.

A method for producing iron oxide yellow pigments by the precipitation method in an alkaline environment is known from U.S. Pat. No. 2,558,304. According to the method described there, it should be possible to produce pale yellow to deep brown iron oxide yellow pigments. In this case a solution of an iron(II) salt ($FeSO_4$ or $FeCl_2$ are mentioned) is added to an alkaline component consisting of a hydroxide of the alkalis or alkaline earths. At the end of precipitation the alkali is present in an amount that is at least 115% of the theoretically required amount. Precipitation is performed at temperatures below 40° C. A precipitation at elevated temperature is not described, in fact, according to U.S. Pat. No. 2,558,304, it is favorable to perform the reaction at lower temperatures, for example at 25° C. Oxidation to α-FeOOH is then performed with air, whereby oxidation times of 15 minutes to 30 hours are required. Typical concentrations of the iron salts are around 100 g Fe per liter. The concentration of the alkaline component is likewise in the area of 100 g/l in cases where NaOH is used. This method delivers very finely divided, in some cases even transparent iron oxide yellow pigments.

The restriction of the reaction temperature to 40° C. hinders the technical feasibility because it means that oxidation can only be performed very slowly. If oxidation is performed more quickly and in relatively large reactors ($\sim 100$ $m^3$ volume), the reaction heat generated (120 kcal/mol equivalent to 502 kJ/mol FeOOH) can no longer be dissipated without cooling.

The method described can therefore only be performed with very complex and expensive cooling or in small reactors or with long oxidation times. All three factors make this method uneconomical if inexpensive iron oxide yellow pigments are to be produced.

Also, numerous publications on the production of iron oxide yellow by the precipitation method in an alkaline environment as a starting material for acicular magnetic iron oxides are known. In this instance the color quality of the iron oxide yellow is irrelevant. DE-A 2 455 158 is an example, in which the production of an iron oxide yellow in an alkaline environment by oxidation of an aqueous solution of an iron(II) salt with an alkali or alkaline-earth metal nitrate or chlorate is described. The color properties of the products obtained are not described, and they are also irrelevant for the application described. Since the method uses relatively expensive oxidizing agents, it is unsuitable for the production of a particularly inexpensive iron oxide yellow. If an iron(II) salt with more than 4 mol % Fe(III) and/or one with more than 0.7 wt. % Mn (based on on the Fe content of the iron(II) salt) is used, no suitable colored pigments are obtained. Yellow pigments for coloring concrete components, plastics, paper or similar media therefore cannot be produced by methods in which feedstocks of this type are used since black magnetite is formed if too much Fe(III) is present or the yellow pigment becomes dark brownish if the manganese content is too high.

An object of the present invention is therefore to provide a method that allows iron oxide yellow to be produced by a very simple and inexpensive method from iron raw materials that are available at a reasonable price.

This object may be achieved by the process of the present invention as described hereinafter.

SUMMARY OF THE INVENTION

The present invention relates to a process for the production of an iron oxide yellow by
a) adding $FeSO_4$ or $FeCl_2$ with an Fe(III) content of 0.0 to 4.0 mol % Fe(III) and a Mn content of up to 0.7 wt. %, based on the Fe content, to a solution or suspension of an alkaline component that has been heated to a temperature of between 42 and 75° C., and
b) oxidizing the suspension formed with an oxidizing agent until all iron(II) has been converted into iron(III) as α-FeOOH,
whereby the oxidizing agent is added at a rate such that the oxidation time is between 120 and 600 minutes and the reaction temperature during the entire oxidation time is at least at the temperature of between 42 and 75° C. at which precipitation of $Fe(OH)_2$ occurred.

DETAILED DESCRIPTION OF THE INVENTION

Hydroxides of alkali metals, carbonates of alkali metals, hydroxides of alkaline-earth metals, carbonates of alkaline-earth metals, oxides of calcium, strontium or barium or ammonia can be used as alkaline component.

The alkaline component is used in a quantity corresponding to 1.2 to 2.5 equivalents, preferably 1.2 to 1.7 equivalents, more preferably 1.5 equivalents, relative to the precipitation reaction $Fe^{2+}+2OH^-\rightarrow Fe(OH)_2$. Thus if $CO_3^{2-}$ is used, for example, only one mol carbonate per mol Fe(II) is required. The concentration of the alkaline component is between 1.25 and 6 equivalents of hydroxyl ions per liter, preferably between 2.5 and 5.5 equivalents of hydroxyl ions per liter, more preferably between 2.25 and 4.5 equivalents of hydroxyl ions per liter.

The concentration of the iron(II) component is between 20 and 200 g/l Fe, preferably between 30 and 150 g/l Fe, more preferably between 50 and 100 g/l Fe.

Atmospheric oxygen, pure oxygen, nitrates, chlorates(I), chlorates(V), chlorates(VII), elementary chlorine, peroxodisulfates, ozone and $H_2O_2$ can be used as oxidizing agent. In order to make the method particularly inexpensive, atmospheric oxygen is preferably used. If elementary chlorine is available, that also can be used. Use of the other cited oxidizing agents is generally possible and can be advantageous in a continuous processing mode, for example. The salts among these oxidizing agents can advantageously be used in dissolved form and they react significantly faster than atmospheric oxygen. If the reaction rate is high enough, the reaction can be performed continuously.

Description of the Analytical Experiments
1. Measurement of the Tristimulus Values in L64 Thix, Brightening The alkyd resin paste used ("L 64") was recommended in many standards as the principal component of a test binder for calorimetric analyses. In DIN standards pyrogenic silicic acid (such as Aerosil 200, Degussa AG, DE) were described as Theological additive. In ISO standards calcium stearate was stipulated as additive in its place. Then again, Sachtleben used a very finely divided, precipitated barium sulfate, (Sachtoperse HP, Sachtleben AG, DE). We used a powdered modified hydrogenated castor oil, (Luvothix HT, Lehmann & Voss & Co., DE) in a concentration of 5.0 wt. %.

The white paste used in routine testing could not be used for this method since the white paste could not be produced with the constant scattering power required for absolute values. Instead of this a defined quantity of powdered titanium dioxide pigment was added during grinding on the plate-type automatic muller (ENGELSMANN, model JEL). The results obtained were largely identical.

The pigment was prepared with the muller in a non-drying test binder. The test binder (paste) contained two components:
Component 1

An alkyd resin binder based on linseed oil and phthalic anhydride (Sacolyd L 640 Krems Chemie AG, AU) (formerly Alkydal L 64 (Bayer AG, DE)) was used. It conformed to the specifications stipulated in the standards DIN EN ISO 787-24 (October 1995), ISO 787-25:1993 and DIN 55983 (December 1983) as requirements for a test binder for colored pigments.
Component 2

A powdered modified hydrogenated caster oil (Luvothix HT, Lehmann & Voss & Co., DE) was added as a rheological additive in order to make the paste thixotropic. It was used in a concentration of 5.0 wt. % based on component 1.

Component 2 was dissolved in component 1 at 75–95° C. The cooled, compact compound was added in one step using a triple roll mill. The paste was now ready. A plate-type automatic muller as described in DIN EN ISO 8780-5 (April 1995) was used. An ENGELSMANN JEL 25/53 muller with an effective plate diameter of 24 cm was employed. The speed of the lower plate was approx. 75 rpm. The force between the plates was adjusted to approx. 0.5 kN by suspending a 2.5 kg weight from the loading loop.

A commercial titanium dioxide pigment (Tronox R-KB-2 Kerr-McGee Corp., US) (formerly Bayertitan R-KB-2, Bayer AG, DE) was used as brightener. The composition of R-KB-2 corresponded to the grade R 2 in ISO 591-1977. If a different R 2 pigment was used instead of R-KB-2, different CIELAB co-ordinates may be obtained during color measurement. 0.4 g of the pigment to be tested, 2.0 g Tronox R-KB-2 pigment and 3.0 g paste were dispersed in five stages for 25 revolutions each according to the method described in DIN EN ISO 8780-5 (April 1995) section 8.1.

The pigment-paste mixture was then spread inside a paste disc whose function corresponded to the paste disc in DIN 55983 (December 1983). The doctor blade on the paste disc was drawn across the indentation in the disc filled with the pigment-paste mixture to produce a smooth surface. The doctor blade was moved in one direction at a speed of approx. 3–7 cm/s. The smooth surface was measured within a few minutes.
Colorimeter A spectrophotometer ("colorimeter") with the measuring geometry d/8 was used without a gloss trap. This measuring geometry was described in ISO 7724/2-1984 (E), point 4.1.1, in DIN 5033 Part 7 (July 1983), point 3.2.4 and in DIN 53236 (January 1983), point 7.1.1.

A Dataflash 2000 measuring instrument (Datacolor International Corp., USA) was used. The calorimeter was calibrated against a white ceramic work standard as described in ISO 7724/2-1984 (E) point 8.3. The reflectance data for the work standard against a perfectly matt white body was stored in the calorimeter so that after calibration with the white work standard all color measurements were relative to the perfectly matt white body. The black dot was calibrated with a hollow black body supplied by the manufacturer of the colorimeter.

Color Measurement

The result of the color measurement was a reflectance spectrum. When calculating calorimetric values the type of light under which the measurement was performed was irrelevant (except in the case of fluorescent samples). Any calorimetric value could be calculated from the reflectance spectrum. A number of boundary conditions had to be taken into consideration during the measurement process, however.

The gloss trap, if fitted, was disconnected. The temperature of the calorimeter and the test sample was approx. 25° C.±5° C.

Measuring the Paint Stroke

The paint was brushed onto the calorimeter such that the measuring aperture covers a middle point on the coat of paint. The stroke was completely flat. The measuring aperture was completely covered by the coat of paint. The measurement was then performed.

Measuring the Paste Disc

The color measurement was performed immediately after spreading the paste into the paste disc. The filled paste disc was placed on the calorimeter such that the measuring aperture was completely filled with the indentation on the disc coated with paste. The disc was completely flat. The measurement was then performed.

Calculating the CIE Co-Ordinates

The CIE 1976 (L*, a*, b*) co-ordinates (known as CIELAB for short) of a reflectance spectrum depended on the chosen boundary conditions during measurement and evaluation. The data given for the wavelength range of 400 nm to 700 nm and the interval of 20 nm was valid for the Dataflash 2000 calorimeters currently in use (as at 7/97).

Only the co-ordinates L*, a* and b* were stated. All other values were redundant.

The CIE 1976 co-ordinates L*, a* and b* were calculated from the measured reflectance spectrum according to the calculation instructions in ASTM E 308-1985, point 7. The weighting functions of standard illuminant C and the 1931 standard 20 observer in ASTM E 308-1985, Table 5.6, were used. The wavelength range was between 400 nm and 700 nm. The wavelength interval was 20 nm. No gloss was deducted in the calculation. The results for L*, a* and b* were rounded to whole numbers.

(The CIE co-ordinates were referred to in DIN 5033 Part 3 (July 1992) as co-ordinates of the L*a*b* color space. The abbreviation CIELAB color space was introduced in ISO 7724/3-1984. The co-ordinates were dimensionless.)

1. Measuring the Tristimulus Values in White Cement (Toni Mixer)

1200.0 g silica sand 0.2–1 mm, 600.0 g silica sand 1–2 mm (both sand grades from "Quarzwerke GmbH", Frechen, DE) and 200.0 g limestone dust (5% maximum oversize>90 μm, "Rheinische Kalksteinwerke GmbH", Wülfrath, DE) were placed together in the mixing container of a Toni-Mix mixer (from "Toni-Technik Baustoffprüfsysteme GmbH", Berlin, DE).

6.000 g of the pigment to be tested was then added and premixed at the slow phase using a mortar mixer. The container was then switched off and the dry mixture additionally mixed thoroughly with a spatula.

500.0 g of white cement ("Dyckerhoff Zement GmbH", Amöneburg, DE, CEM I 42.5R or 52.5 R) were now added to this mixture. The Toni mixer was then started up and 175.0 g of distilled water were added through a dropping funnel, ensuring that the water was introduced into the middle of the mixture. The water was added within 20 s. The new dispersal stage using the slow stirring phase lasted for 100 s.

A compression mold (internal dimensions 100×100×70 mm) was filled with this mixture until the mixture was approx. 1 cm from the upper edge of the mold, and it was then compressed in the steel compression mold at 300 bar.

Four non-overlapping areas on the surface formed in the compression mold as a result of the compression were then measured immediately after compression using a Minolta CR310 calorimeter. Standard illuminant C and the 2° observer were used. The identical procedure was performed with the reference pigment, ensuring that it was prepared in exactly the same way.

The average was taken of the values obtained from the four measurements of a surface. They were evaluated by applying the Saunderson adjustment, whereby the constants were chosen for a refractive index of 1.5, to the reflectometer values obtained by the color measurement according to DIN 53 140, averaged and divided by 100. The Kubelka-Munk function was then calculated for the values obtained.

The ratio of the results obtained in this way from standard tristimulus value Y was defined as the color intensity (see Hans G. Völz, Industrielle Farbprüfung, VCH 1990).

The mean values from repeat determinations were given in each case.

2. Measuring the BET Surface Area

The BET surface area was determined by reference to DIN 66 131 (the deviations from the standard concern the stated parameters). Gas mixture: 90 vol. % He, 10 vol. % $N_2$, measuring temperature 77.4 K, curing at 140° C., 60 minutes.

3. Radiographic Crystallite Size

The crystallite size was determined using a Phillips powder diffractometer. Reference was made to the 110 reflex in order to determine the crystallite size.

α-iron oxide hydroxide (M(FeOOH)=88.9 g/mol 3.1 Scope

Determining the crystallite size in goethite in the range from 5 to 100 nm.

3.2 Principle

Determination in goethite was performed by reflectance detection after X-ray diffractometric irradiation. The results were evaluated using silicon as external standard.

3.3 Reagent

Silicon standard for angle calibration (ICDD no. 27-1402), Philips PW 1062/20.

3.4 Instruments 3.4.1 Diffractometer:

Philips PW 1800 goniometer

Model: theta-2 theta 3.4.2 Sample introduction: 21-compartment sample changer 3.4.3 Detector: Xe proportional counter 3.4.4 Reflex evaluation: X-Pert software version 1.2 on HP Vectra VL 3.4.5 Agate mortar and pestle 3.4.6 Sample holder: Philips PW 1811/00 and PW 1811/27

3.5 X-ray diffractometric conditions 3.5.1 X-ray tube: Long fine focus, Cu anode, 60 kV, 2200 W 3.5.2 Radiation: $CuK\alpha_1$, $\lambda$=0.154056 nm 3.5.3 Generator: 40 kV, 40 mA 3.5.4 Scan parameters:
3.5.4.1 Scan type: Step scan
3.5.4.2 Step size: 0.020° 2theta
3.5.4.3 Step measuring time: 2.00 s
3.5.5 Silicon standard:
3.5.5.1 Low angle: 27.00° 2theta
3.5.5.2 High angle: 30.00° 2theta
3.5.6 Sample:
3.5.6.1 Low angle: 18.50° 2theta
3.5.6.2 High angle: 23.50° 2theta
3.6 Method
3.6.1 External standard
3.6.1.1 Introduced the silicon standard (3.1) into the sample holder of the diffractometer and started the measuring program.
3.6.1.2 Determined the maximum and the half-width of the silicon reflex with the Miller indices hkl=111 in the 2theta angle range 27.00° to 30.00°. Printed out the peak parameters (Table 1) and optionally the diffractogram.
3.6.2 Determination in the sample:
3.6.2.1 Grinded approx. 2 g sample in the agate mortar (4.5).
3.6.2.2 Introduced approx. 1 g sample into the sample holder (4.6) of the diffractometer and started the measuring program.
3.6.2.3 Determined the maximum and the integral breadth of the goethite reflex with the Miller indices hkl=110 in the 2theta angle range 18.50° to 23.50°. Printed out the peak parameters (Table 2) and optionally the diffractogram.
3.7 Calculations
3.7.1 Entered the integral breadth (width of broadened profile), the maximum (peak position/° 2theta) of the goethite reflex and the reflex half-width (width of standard profile/FWHM) of the silicon standard in the crystallite size determination table (X'Pert software, version 1.2 (Philips Analytical GmbH, Kassel, DE) Profile Widths) displayed by the computer. Created and printed out the evaluation report (Table 2).
3.7.2 The crystallite size was determined in the X'Pert program according to the Scherrer equation:

$$D_{(crystallite\ size)} = \frac{k \cdot \lambda}{W_{size} \cdot \cos\theta}$$

$D_{(crystallite\ size)}$ Crystallite size in nm
k Form factor for the crystallite=0.9 (mean value from the literature)
$\lambda$ Wavelength in nm
$W_{size}$ Integral breadth of the goethite reflex—reflex half-width of the silicon standard
$\cos\theta$ Maximum of the goethite reflex in °2theta

TABLE 1

| Peak parameters for the silicon reflex | |
|---|---|
| Parameter | |
| Position (°2 theta) | 28.45746 |
| Net height (counts) | 8588.32 |
| Background height at peak position (counts) | 66.56 |
| Net area (°2 theta * counts) | 1182 |
| Background area (°2 theta * counts) | 200 |
| FWHM (°2 theta) | 0.0976 |
| Integral breadth (°2 theta) | 0.1376 |
| FWHM/integral breadth | 0.7094 |
| Asymmetry | 0.99 |

TABLE 1-continued

| Background | | |
|---|---|---|
| Low angle side | (°2 theta) | 27.02000 |
| | (counts) | 61.58 |
| High angle side | (°2 theta) | 29.98000 |
| | (counts) | 71.75 |

TABLE 2

| Peak parameters for the goethite sample: crystallite size 46.5 nm | |
|---|---|
| Position (°2 theta) | 21.25219 |
| Net height (counts) | 2120.73 |
| Background height at peak position (counts) | 44.92 |
| Net area (°2 theta * counts) | 589 |
| Background area (°2 theta * counts) | 237 |
| FWHM (°2 theta) | 0.2061 |
| Integral breadth (°2 theta) | 0.2779 |
| FWHM/integral breadth | 0.7415 |
| Asymmetry | 1.16 |
| Background | |
| Low angle side (°2 theta) | 18.54000 |
| (counts) | 58.38 |
| High angle side (°2 theta) | 23.67000 |
| (counts) | 33.05 |

TABLE 3

Crystallite size determination using X'Pert program; Scherrer equation
Menu item: additional functions in X'Pert program part: X'Pert Organizer

| Anode material: | Cu (copper) |
|---|---|
| Radiation type: | Cu Kα |
| Wavelength (nm) | 0.154184 |
| K factor (mean form factor) | 0.9000 |
| Intensity ratio (Cu Kα$_1$/Cu Kα$_2$) | 0.5000 |

| Signal width of broadening (°2 theta) | Signal breadth (°2 theta) | Particle size distribution (°2 theta) | Lattice potential broadening (°2 theta) | Peak position (°2 theta) | Crystallite size (nm) |
|---|---|---|---|---|---|
| 0.1376 | 0.0976 | 0.0400 | 0.0970 | 28.45500 | 205.1 |
| 0.2779 | 0.0976 | 0.1803 | 0.2602 | 21.25400 | 44.9 |
| 0.2766 | 0.0976 | 0.1790 | 0.2588 | 21.25100 | 45.2 |
| 0.8814 | 0.0976 | 0.7838 | 0.8760 | 21.22800 | 10.3 |
| 0.9325 | 0.0976 | 0.8349 | 0.9274 | 21.24400 | 9.7 |
| 0.4287 | 0.0976 | 0.3311 | 0.4174 | 21.22090 | 24.4 |
| 0.4274 | 0.0976 | 0.3298 | 0.4161 | 21.21911 | 24.5 |

4. Ultimate Analysis of Mn

Manganese was determined in a sample completely dissolved in HCl by means of ICP-OES (inductive coupled plasma optical emission spectroscopy, a common method in trace analysis).

EXAMPLES

Example 1

12.044 liters of a 100 g/l sodium hydroxide solution (30.111 mol NaOH) were heated to 54° C. in a 30-liter stirred-tank reactor with straight-arm paddle agitator and aeration ring on the floor of the stirred-tank reactor. Once this temperature had been reached, 12.675 liters of an iron(II) chloride solution with an Fe(III) content of 0.5 mol % Fe(III) and a manganese content of 0.35 wt. % Mn (based on the iron content) and an FeCl$_2$ content of 100 g/l=44.2 g/l Fe (10.0 mol) were pumped in over 40 minutes. Atmospheric oxygen was then passed through the aeration ring at 100 liters per hour for 226 minutes. The iron oxide yellow formed had the following properties:

| | | |
|---|---|---|
| Brightness L* | 82.1 | |
| a* | 2.6 | L64 thix, brightening |
| b* | 35.2 | |
| Brightness L* | 61.3 | |
| a* | 0.7 | White cement |
| b* | 30.1 | |
| BET surface area [m²/g] | 29.0 | |
| Crystallite size [A] | 210 | |
| Mn content [wt. %] | 0.29 | |

Example 2

12.000 liters of a 100 g/l sodium hydroxide solution (30.0 mol NaOH) were heated to 64° C. in a 30-liter stirred-tank reactor with straight-arm paddle agitator and aeration ring on the floor of the stirred-tank reactor. Once this temperature had been reached, 12.675 liters of an iron(II) chloride solution with an Fe(III) content of 0.5 mol % Fe(III) and a manganese content of 0.35 wt. % Mn (based on the iron content) and an FeCl$_2$ content of 100 g/l=44.2 g/l Fe (10.0 mol) were pumped in over 40 minutes. Atmospheric oxygen was then passed through the aeration ring at 100 liters per hour for 234 minutes. The iron oxide yellow formed had the following properties:

| | | |
|---|---|---|
| Brightness L* | 81.1 | |
| a* | 2.7 | L64 thix, brightening |
| b* | 35.0 | |
| Brightness L* | 61.8 | |

-continued

| | | |
|---|---|---|
| a* | 0.8 | White cement |
| b* | 30.6 | |
| BET surface area [m²/g] | 18.8 | |
| Crystallite size [A] | 275 | |
| Mn content [wt. %] | 0.27 | |

Example 3

9.520 liters of a 200 g/l sodium hydroxide solution (47.60 mol NaOH) were heated to 59° C. in a 30-liter stirred-tank reactor with straight-arm paddle agitator and aeration ring on the floor of the stirred-tank reactor. Once this temperature had been reached, 17.238 liters of an iron(II) chloride solution with an Fe(III) content of 0.5 mol % Fe(III) and a manganese content of 0.35 wt. % Mn (based on the iron content) and an FeCl$_2$ content of 125 g/l=55.3 g/l Fe (10.0 mol) were pumped in over 45 minutes. Atmospheric oxygen was then passed through the aeration ring at 170 liters per hour for 342 minutes. The iron oxide yellow formed had the following properties:

| | | |
|---|---|---|
| Brightness L* | 81.3 | |
| a* | 2.6 | L64 thix, brightening |
| b* | 34.7 | |
| Brightness L* | 61.6 | |
| a* | 0.5 | White cement |
| b* | 30.2 | |
| BET surface area [m²/g] | 23.0 | |
| Crystallite size [D] | 250 | |
| Mn content [wt. %] | 0.29 | |

Examples 4–9

The same procedure was followed as for Example 1. The following settings were chosen:

| Example no. | NaOH mol | cNaOH g/l | Fe component | Fe mol | cFe g/l | Temp ° C. | Precipitation time min | Air l/h |
|---|---|---|---|---|---|---|---|---|
| 4 | 40 | 200 | FeCl$_2$ | 10 | 80 | 60 | 45 | 100 |
| 5 | 40 | 200 | FeCl$_2$ | 10 | 80 | 75 | 45 | 100 |
| 6 | 40 | 300 | FeCl$_2$ | 10 | 80 | 75 | 45 | 100 |
| 7 | 40 | 200 | FeSO$_4$ | 10 | 80 | 60 | 45 | 100 |
| 8 | 30 | 300 | FeCl$_2$ | 10 | 70 | 60 | 45 | 100 |
| Comp. 1 | 30 | 100 | FeCl$_2$ | 10 | 44.2 | 34 | 40 | 100 |
| Comp. 2 | 22 | 100 | FeCl$_2$ | 10 | 44.2 | 60 | 40 | 100 |

The iron(II) chloride used had an Fe(III) content of 0.9 mol % Fe(III) and a Mn content of 0.35 wt. % based on the Fe content.

The FeSO$_4$ used in test 7 had an Fe(III) content of 1.1 mol % Fe(III) and a Mn content of 0.28 wt. % based on the iron content.

These tests produced the results listed below:
Brightening, L64 thix+white cement

| Example no. | Oxidation time [min] | L* | a* | b* | L* | a* | b* | BET [m²/g] | CS nm |
|---|---|---|---|---|---|---|---|---|---|
| 4 | 220 | 81.1 | 2.5 | 34.2 | 61.3 | 0.7 | 31.0 | 22.8 | 26 |
| 5 | 190 | 81.4 | 2.7 | 34.7 | 61.5 | 0.8 | 31.4 | 19.5 | 31 |
| 6 | 230 | 81.3 | 2.6 | 34.5 | 61.4 | 0.6 | 31.3 | 21.3 | 28 |
| 7 | 210 | 81.0 | 3.2 | 33.8 | 61.2 | 1.3 | 30.6 | 24.9 | 25 |
| 8 | 165 | 81.2 | 2.5 | 34.7 | 61.5 | 0.7 | 31.5 | 20.9 | 29 |
| Comp. 1 | 205 | 78.5 | 1.6 | 28.6 | 60.5 | 0.1 | 29.8 | 62.5 | 12 |
| Comp. 2 | 185 | 60.2 | 0.2 | 21.5 | 53.4 | 0.0 | 24.6 | 21.0 | 28 |

Comparative test 2 contained small amounts of magnetite. In the tests with $FeCl_2$ the analyzed Mn content was between 0.26 and 0.29 wt. %.

The Mn content in test 7 was 0.21 wt. %.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of yellow iron oxide comprising
   a) adding an iron component comprising $FeSO_4$ or $FeCl_2$ with an Fe(III) content of 0.5 to 1.5 mol % Fe(III) and a Mn content of up to 0.7 wt. %, based on the Fe content of $FeSO_4$ or $FeCl_2$, to a solution or suspension of an alkaline component that has been heated to a temperature of between 42 and 75° C., and
   b) oxidizing the suspension formed with an oxidizing agent until all iron(II) has been converted into iron(III) as α-FeOOH,
   wherein the oxidizing agent is added at a rate such that the oxidation time is between 120 and 600 minutes and the reaction temperature during the entire oxidation time is the same as the temperature during step a).

2. The process of claim 1, wherein Mn is present in a positive amount of up to 0.4 wt. %, based on the Fe content of $FeSO_4$ or $FeCl_2$.

3. The process of claim 1, wherein the suspension of step a) is heated to a temperature between 45 to 60° C.

4. The process of claim 1, wherein the oxidation time is between 180 and 360 minutes.

5. The process of claim 1, wherein the alkaline component comprises a member selected from the group consisting of hydroxides of alkali metals, carbonates of alkali metals, hydroxides of alkaline-earth metals, carbonates of alkaline-earth metals, oxides of calcium, strontium or barium and ammonia.

6. The process of claim 1, wherein the alkaline component is used in a quantity corresponding to 1.2 to 2.5 equivalents, based on the equivalents of base needed to convert $Fe^{2+}$ to $Fe(OH)_2$.

7. The process of claim 1, wherein the alkaline component is used in a quantity corresponding 1.2 to 1.7 equivalents, based on the equivalents of base needed to convert $Fe^{2+}$ to $Fe(OH)_2$.

8. The process of claim 1, wherein the concentration of the alkaline component is between 1.25 and 6 equivalents per liter of said solution or suspension.

9. The process of claim 1, wherein the concentration of the alkaline component is between 2.5 and 5.5 equivalents per liter of said solution or suspension.

10. The process of claim 1, wherein the concentration of the alkaline component is between 2.25 and 4.5 equivalents per liter of said solution or suspension.

11. The process of claim 1, wherein the iron component is present as a solution having a concentration of between 20 and 200 g/l Fe.

12. The process of claim 1, wherein the iron component is present as a solution having a concentration of between 30 and 150 g/l Fe.

13. The process of claim 1, wherein the iron component is present as a solution having a concentration of is between 40 and 100 g/l Fe.

14. The process of claim 1, wherein the oxidizing agent is selected from the group consisting of atmospheric oxygen, pure oxygen, nitrates, chlorates(I), chlorates(V), chlorates (VII), elemental chlorine, peroxodisulfates, ozone and $H_2O_2$.

* * * * *